United States Patent Office.

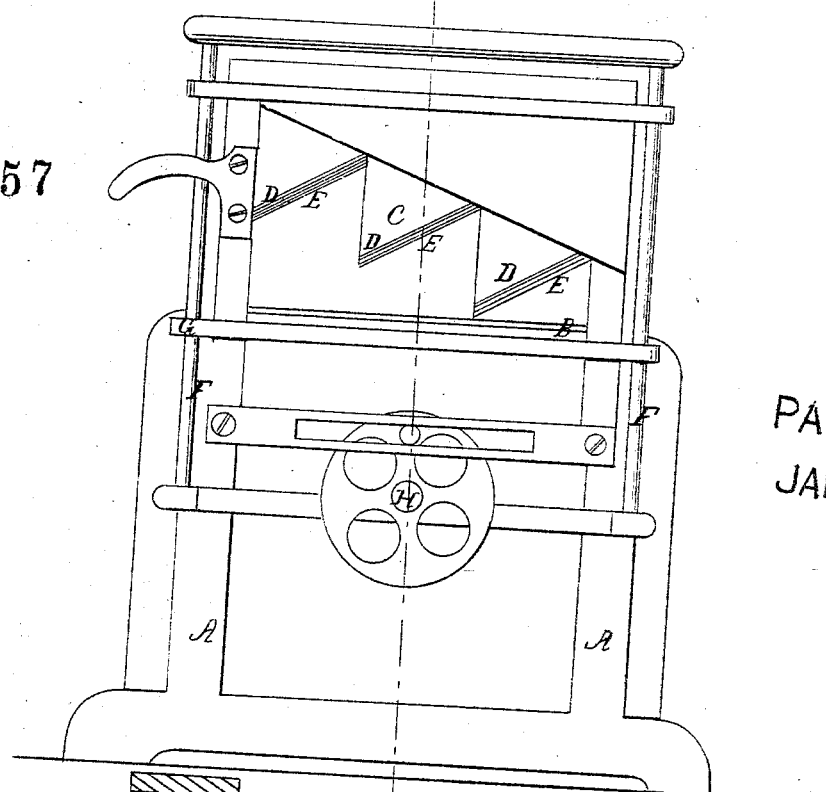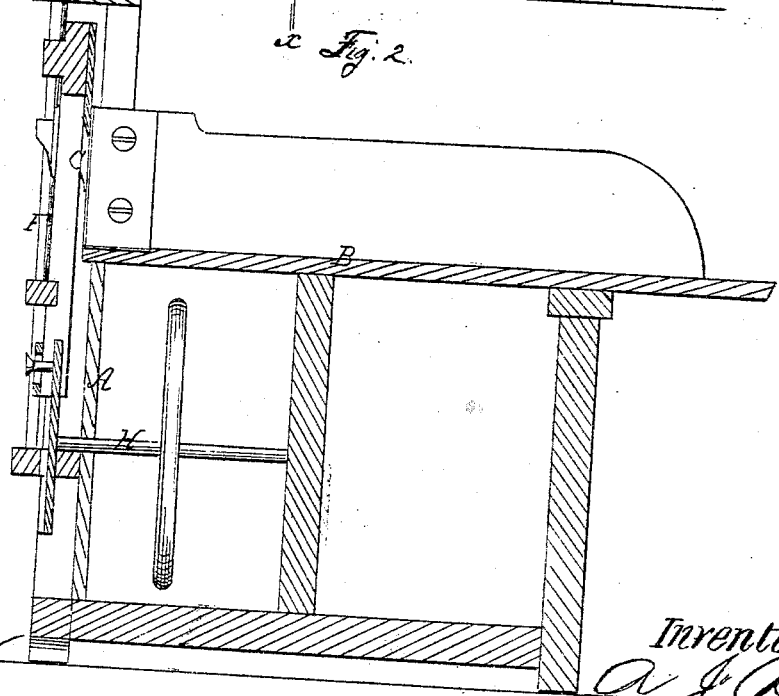

A. J. BELL, OF BLOOMINGBURG, NEW YORK.

Letters Patent No. 73,157, dated January 7, 1868.

---

IMPROVEMENT IN STRAW-CUTTERS.

---

*The Schedule referred to in these Letters Patent and making part of the same.*

---

TO ALL WHOM IT MAY CONCERN:

Be it known that I, A. J. BELL, of Bloomingburg, in the county of Sullivan, and State of New York, have invented a new and useful Improvement in Straw or Hay-Cutters; and I do hereby declare that the following is a full, clear, and exact description thereof, which will enable others skilled in the art to make and use the same, reference being had to the accompanying drawings, forming part of this specification.

The present invention relates to that class of hay or straw-cutters, the cutting-blade of which is carried by a frame arranged to have an up-and-down motion in a vertical plane; and the invention consists in giving to the cutting-edge of the knife or cutter-blade a shape similar to that of the teeth of a saw-blade, with the inclined edge of such teeth suitably sharpened to cut, whereby, while a drawing cut is produced upon the hay or straw, it is done by a cutting-edge, of such form as to require but little force and strength, and with much facility and ease. In the accompanying plate of drawings my improvement in hay and straw-cutters is illustrated—

Figure 1 being an elevation of the same at the front end, and

Figure 2 a longitudinal vertical section, taken in the plane of the line $x$ $x$, fig. 1.

Similar letters of reference indicate corresponding parts.

A, in the drawings, represents an upright frame, supporting the box B, in which the hay, straw, &c., is placed for being fed to the knife or cutter-blade, C, for being cut. This cutter-blade C, along its cutting-edge, is made with a series of teeth, D, like those of a saw-blade, with the inclined edges E of such teeth suitably bevelled or sharpened for cutting hay or straw, &c., when fed to the same, and as the blade is brought down thereon by the up-and-down movement imparted to the vertical frame F, arranged for such action in suitable upright guides G, and by the revolution of a driving-shaft, H.

I claim as new, and desire to secure by Letters Patent—

The toothed cutter-blade C, in combination with the frame G, guides F, and box B, all constructed, arranged, and operating substantially as described.

The above specification of my invention signed by me, this 11th day of September, 1867.

A. J. BELL.

Witnesses:
WM. F. McNAMARA,
WM. DEAN OVERELL.